(12) United States Patent
Yokomura et al.

(10) Patent No.: US 9,193,259 B2
(45) Date of Patent: Nov. 24, 2015

(54) TANK COVER ATTACHMENT STRUCTURE OF STRADDLE TYPE VEHICLE

(71) Applicant: HONDA MOTOR CO., LTD., Tokyo (JP)

(72) Inventors: Hikaru Yokomura, Wako (JP); Yuki Mizukura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 14/017,496

(22) Filed: Sep. 4, 2013

(65) Prior Publication Data

US 2014/0061203 A1    Mar. 6, 2014

(30) Foreign Application Priority Data

Sep. 6, 2012    (JP) .................................. 2012-195943

(51) Int. Cl.
*B62J 23/00*    (2006.01)
*B62J 35/00*    (2006.01)
*B60K 15/03*    (2006.01)

(52) U.S. Cl.
CPC ........... *B60K 15/03006* (2013.01); *B62J 23/00* (2013.01); *B62J 35/00* (2013.01)

(58) Field of Classification Search
CPC ............ B62J 35/00; B62J 23/00; B62J 17/00; B60K 15/03006; B60K 15/07

USPC ............... 180/219; 280/833, 834, 835, 304.3, 280/770; 296/181.1, 78.1, 180.1
See application file for complete search history.

(56) References Cited

U.S. PATENT DOCUMENTS

| | | | |
|---|---|---|---|
| 6,341,792 B1* | 1/2002 | Okuma ...................... | 280/304.3 |
| 7,552,788 B2* | 6/2009 | Satake ......................... | 180/68.1 |
| 2006/0175112 A1* | 8/2006 | Yoshida et al. ............... | 180/229 |
| 2009/0322069 A1* | 12/2009 | Koike ........................... | 280/835 |
| 2011/0204613 A1* | 8/2011 | Aoki .............................. | 280/830 |
| 2012/0274057 A1* | 11/2012 | Kanai ........................... | 280/835 |
| 2013/0161970 A1* | 6/2013 | Takasu et al. .................... | 296/29 |
| 2013/0240584 A1* | 9/2013 | Nagayoshi et al. ............ | 224/413 |
| 2014/0262571 A1* | 9/2014 | Murayama .................... | 180/68.3 |
| 2014/0292026 A1* | 10/2014 | Salvaggio, Jr. ............. | 296/181.1 |

FOREIGN PATENT DOCUMENTS

JP    4028657    10/2007

* cited by examiner

*Primary Examiner* — Anne Marie Boehler
(74) *Attorney, Agent, or Firm* — Rankin, Hill & Clark LLP

(57) ABSTRACT

A tank cover attachment structure of a straddle type vehicle that can easily and precisely attach a tank cover, which covers the area ranging from the side of a fuel tank to the side of the upper portion of an engine, on the vehicle body side with the highly strong and simple structure. Tank supporting brackets connect left and right front edge portions of a fuel tank to a support rod on the vehicle body side. Engaging portions, which extend outside in the width direction of the vehicle relative to connecting portions with the fuel tank, are integrally provided to the tank supporting brackets. Tank covers are joined to the engaging portions.

19 Claims, 10 Drawing Sheets

TANK COVER ATTACHMENT STRUCTURE OF STRADDLE TYPE VEHICLE

FIELD OF THE INVENTION

The present invention relates to an attachment structure of a tank cover covering the side on the outer side in the width direction of the vehicle of a fuel tank in a straddle type vehicle such as a motorcycle.

DESCRIPTION OF RELATED ART

There is a straddle type vehicle such as a motorcycle, in which an engine is disposed below a main frame extending rearward of the vehicle from a head pipe and a fuel tank is attached on the upper portion of the main frame. Then, the straddle type vehicle of this type, in which the side on the outer side in the width direction of the vehicle of the fuel tank is covered by a resin-made tank cover, is known (for example, Japanese Patent No. 4028657).

In a tank cover attachment structure described in Japanese Patent Publication No. 4028657, a flange portion is projected on the upper surface of the area that is inclined downward from the top portion of the front edge portion of the fuel tank to the left and right sides, and a tank cover is fixed so as to be fastened to a flange portion in such a way as to be screwed while the portion corresponding to a tank cover is abutted on a flange portion.

SUMMARY OF THE INVENTION

Recently, enhancing the air guiding effect to an engine during traveling of a motorcycle is under consideration in such a way to extend a tank cover from the front side of the side portion of the vehicle to the side position of the engine disposed below the fuel tank.

However, if the conventional tank cover attachment structure as mentioned above is adopted without change, the tank cover is fixed on the flange portion projected on the upper surface of the front edge portion of the fuel tank, so that the extending area on the lower side of the tank cover is spaced widely apart downward from the flange portion which is the joining portion on the fuel tank side. Consequently, the extending area of the tank cover is likely to cause a flapping during traveling of the vehicle and the like.

It is possible as a measure to solve this problem to extend the flange portion projected on the fuel tank so as to be bent on the lower side of the vehicle. In that case, however, it is difficult to maintain the strength of the flange portion.

Further, it is possible as another measure to extend the front edge portion itself of the fuel tank downward. In that case, however, since it is difficult to manufacture the fuel tank, adopting such measure is not feasible in terms of the production cost.

Furthermore, it is also possible as another measure to provide a stay for attaching the tank cover at the corresponding position above a body frame corresponding to the appropriate supporting position of the tank cover. In that case, however, it is difficult to secure the positional accuracy of the stay. Besides, it is necessary to perform the attachment and detachment operation at the position in which the stay is fixed to the tank cover, in addition to the fixing position of the fuel tank, when attaching and detaching the fuel tank, so that the number of operation process increases. Moreover, in that case, since it is necessary to attach the dedicated stay to the body frame, the number of components also increases.

It is therefore an object of the present invention to provide a tank cover attachment structure of a straddle type vehicle that can easily and precisely attach a tank cover, that covers the area ranging from the side of a fuel tank to the side of the upper portion of an engine, on the vehicle body side with the highly strong and simple structure.

In accordance with one aspect of the invention, a straddle type vehicle includes a fuel tank that is attached to body frame members provided above an engine and stores the fuel to be supplied to the engine; tank covers that cover the area ranging from the side of the fuel tank to the side of the upper portion of the engine; and left and right tank supporting brackets that are attached to the body frame member below the front portion of the fuel tank and connect the left and right front edge portions of the fuel tank to the body frame member, respectively. Engaging portions, which extend outside in the width direction of the vehicle relative to connecting portions with the fuel tank, are integrally provided to the tank supporting brackets, and the tank covers are connected to the engaging portions.

Accordingly, the tank cover can be supported on the vehicle body side with high strength and high positional accuracy using the tank supporting brackets, which are disposed below the front portion of the tank cover. In addition, according to the present invention, since the tank cover can be attached on the vehicle body side without adding dedicated components on the fuel tank side and on the body frame member side, the number of components and attachment processes is reduced, which thereby can reduce the production cost.

In accordance with another aspect of the invention, in the tank cover attachment structure of the straddle type vehicle, the main part of the tank supporting brackets is formed of a thin metal plate and is joined to the fuel tank with a bolt. Consequently, it is possible to reduce the resistance attributed to the traveling wind against the tank support brackets and the joining portion of the tank supporting brackets with the fuel tank.

In accordance with a further aspect of the invention, the area, which is located on the upper side relative to a joining portion of the tank covers with the tank supporting brackets, is directly joined to the fuel tank, the tank supporting brackets are fixed to the body frame member via a rubber elastic body and are directly joined to the fuel tank and to the tank covers without the rubber elastic body at the same time. Thus, it is possible to enhance the attachment accuracy between the tank cover and the fuel tank, and the appearance quality. On the other hand, in the present invention, the tank supporting brackets are connected to the body frame member via the rubber elastic body, which thereby can absorb the assembly error.

In further accordance with the present invention, the tank covers have a front top portion that projects to the front side of the vehicle between the upper end portion and the lower end portion in a side view of the vehicle; an inclined side of upper portion that extends obliquely upward from the front top portion so as to be directed to the upper end portion; and an inclined side of lower portion that is inclined obliquely downward from the front top portion so as to be directed to the lower end portion, and the joining portion of the tank covers with the tank supporting brackets is set substantially on the same level as the front top portion. Accordingly, during the travelling of the vehicle, it is possible to effectively absorb the impact load generated when external obstacles make contact with the part in vicinity of the upper end portion of the inclined side of upper portion and in the vicinity of the lower end portion of the inclined side of lower portion of the tank cover. Therefore, it is possible to prevent the tank cover from being damaged or from falling away from the vehicle body before it occurs.

In further accordance with the present invention, the joining portion of the tank covers with the tank supporting brackets and the engaging portions of the tank supporting brackets extend horizontally, respectively, and are joined so as to overlap with each other. Accordingly, it is possible to effectively reduce the resistance attributed to the traveling wind and to enable the tank cover to have the high support strength against the load that forces the tank cover to fall away from the front end side of the vehicle.

In further accordance with the present invention, the lower surface of the fuel tank is inclined downward to the rear so as to be directed to the upper portion of the engine in a side view of the vehicle. With such structure, the tank cover and the lower surface of the fuel tank can effectively guide the traveling wind to the upper portion of the engine.

DETAILED DESCRIPTION OF THE PREFERRED EMBODIMENTS

Figure 1:
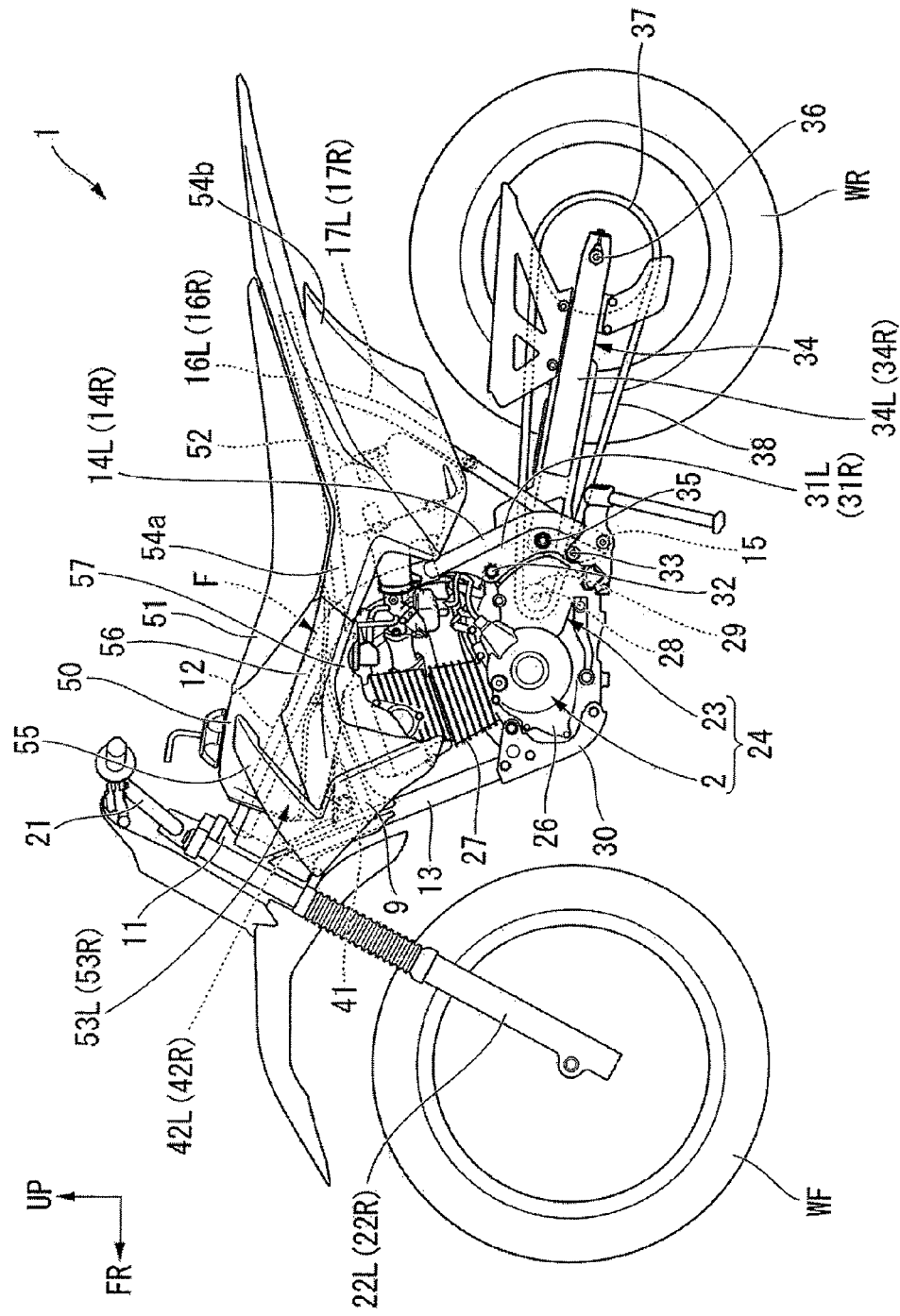
FIG. 1 is a side view of a straddle type vehicle according to the embodiment of the present invention.

Hereinafter, the embodiment of the present invention will be described with reference to the drawings. Incidentally, the directions such as front, rear, left and right in the description below are the same as those of the vehicle, unless it is explicitly stated otherwise. In addition, in the drawing, an arrow FR shows the front, an arrow UP shows the upper, and an arrow LH shows the left side of the vehicle.

FIG. 1 is a side view of an entire straddle type vehicle according to the embodiment of the present invention.

The straddle type vehicle in the embodiment of the present invention is an off-road type motorcycle in which a rear wheel WR is driven by an engine 2. Hereinafter, the straddle type vehicle in the embodiment of the present invention is called a motorcycle 1.

A body frame F of the motorcycle 1 includes a head pipe 11 disposed on the front end portion thereof; a main frame 12 extending obliquely downward to the rear direction from the head pipe 11; a downpipe 13 extending downward from the lower position of the connecting portion with the main frame 12, which is disposed on the head pipe 11; and two center pipes 14L, 14R extending so as to curve downward from the left and right side portions of the rear area of the main frame 12. The lower end portions of the center pipes 14L, 14R are joined by a cross pipe 15 extending in the width direction of the vehicle. The body frame F also includes left and right seat rails 16L, 16R extending toward the rear side of the vehicle from the rear portion of the main frame 12; and supporting pipes 17L, 17R that connect the lower portion area on the upper side of the center each of the left and right center pipes 14L, 14R relative to the cross pipe 15 with the rear portion area of the corresponding left and right seat rails 16L, 16R. Each of the left and right the supporting pipes 17L, 17R extend so as to be inclined upward from the front end portion toward the rear end portion, and the area, which is surrounded by the seat rails 16L, 16R, the center pipes 14L, 14R and the supporting pipes 17L, 17R, is formed substantially in a triangle shape in a side view. Further, the area on the down pipe 13, which is slightly positioned lower than the joining portion with the head pipe 11, and the upper side area of the rear portion of the main frame 12 are connected by a reinforcing pipe 9 extending in the front-and-rear direction of the vehicle.

Incidentally, the member, which is not shown out of the above-mentioned members so as to be located in the far side and overlap the member in the near side of the sheet, is given reference numeral in the parenthesis for convenience (for example, the center pipe 14R). In the description below, the members, which are not shown so as to be located in the far side and overlap the member in the near side of the sheet, are treated in the same way.

A steering stem (not shown) is rotatably and pivotably supported on the head pipe 11.

A steering handle 21 and left and right front forks 22L, 22R are joined to the steering stem. A front wheel WF is rotatably and pivotably supported on the lower end portion of the front forks 22L, 22R.

A fuel tank 50 is attached to the upper portion of the main frame 12, and a seat 51, on which a rider sits, is attached on the seat rails 16L, 16R disposed on the rear portion of the fuel tank 50. In addition, there is provided an air cleaner 52 for filtering the air, which is taken in by the engine 2, in the space of the inside of the width direction of the vehicle in the area which is formed substantially in a triangle shape in a side view surrounded by the seat rails 16L, 16R, the center pipes 14L, 14R and the supporting pipes 17L, 17R.

An engine block 24, which mainly comprises the engine 2 and a transmission 23, is disposed in the area surrounded by the reinforcing pipe 9, the downpipe 13 and the center pipes 14L, 14 below the main frame 12. The engine 2a is configured such that a cylinder block 27 is integrally connected to the upper portion of a crankcase 26 accommodating the crank shaft. The transmission 23 is integrally connected to the rear portion of the crankcase 26 of the engine 2, and the transmission 23 is provided with an output shaft 28 for taking the power of the engine 2 outside. The output shaft 28 protrudes to the left side in the width direction of the vehicle, and a drive sprocket 29 is integrally joined to the protruding end thereof.

Incidentally, in FIG. 1, 53L, 53R are resin-made tank covers covering the side ranging from the fuel tank 50 to the upper edge portion of the engine block 24. 54a, 54b are resin-made tank covers covering the side below the seat including the side of the air cleaner 52, in the rear of tank covers 53L, 53R. The tank covers 53L, 53R will be described in detail later.

The lower end of the front portion of the engine block 24 is fixed to the lower edge portion of the downpipe 13 via a bracket 30 so as to be fastened thereto. The rear edge portion of the engine block 24 is supported via engine hanger bolts 32, 33 on pivot plates 31L, 31R, each of which is attached to each lower edge portion of the left and right center pipes 14L, 14R.

In addition, a pivot shaft 35, which swingably and pivotally supports the front edge portion of a swing arm 34, is attached in the intermediate area in the vertical direction of the pivot plates 31L, 31R.

The swing arm 34 has arm portions 34L, 34R, the front end portion of both of the arm portions 34L, 34R is pivotally supported by the pivot shaft 35, and an axle 36 of the rear wheel WR is rotatably and pivotally supported on the rear end portion of both of the arm portions 34L, 34R. A driven sprocket 37 is integrally attached to the left side in the width direction of the vehicle of the axle 36. A drive chain 38 for transferring the power of the engine 2 to the rear wheel WR is spanned between the drive sprocket 29 provided on the engine block 24 side and the driven sprocket 37 provided on the rear portion of the swing arm 34.

Incidentally, the swing arm 34 is supported by the body frame F via a cushion unit (not shown).

Figure 2:
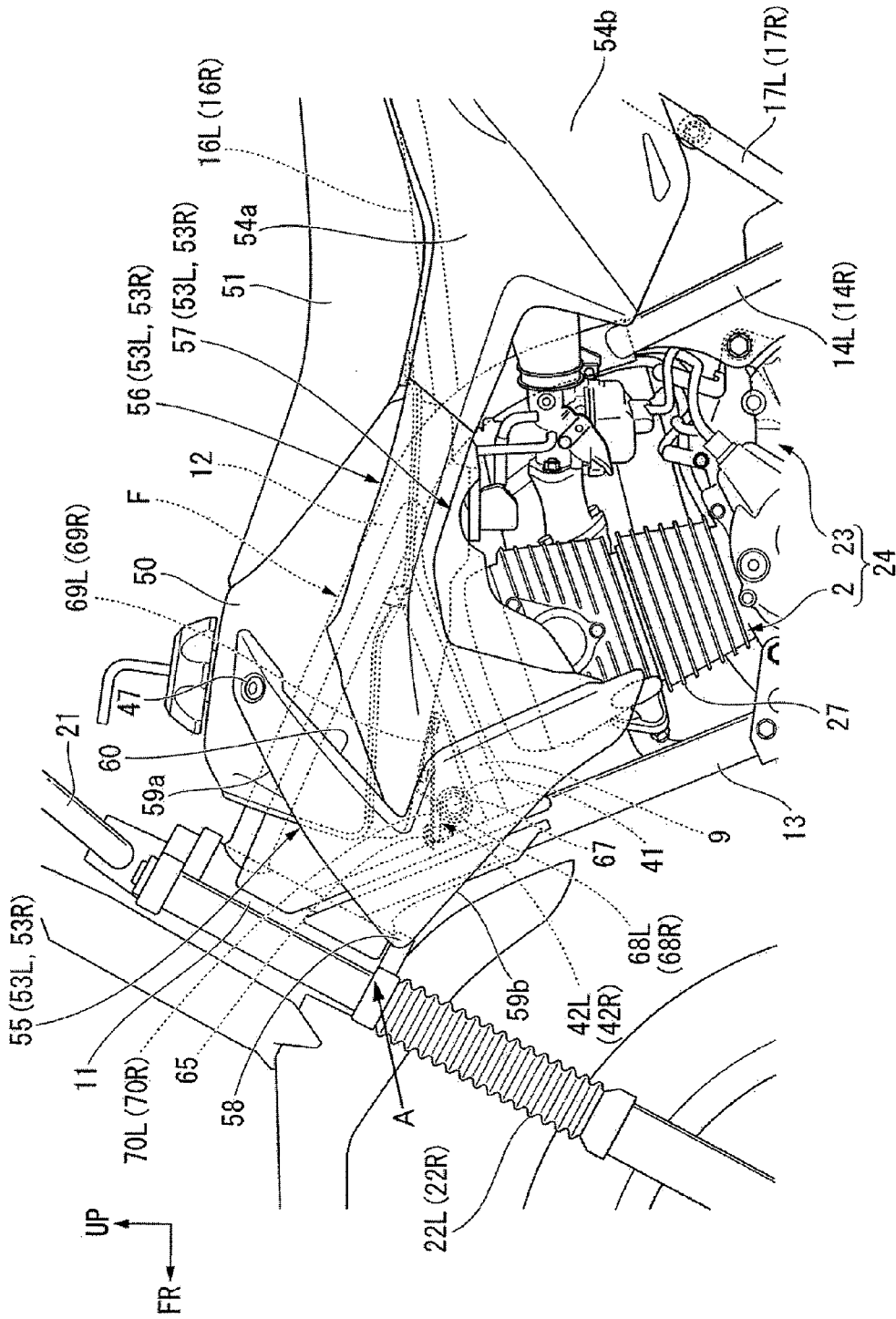
FIG. 2 is a side view of the enlarged part in FIG. 1 of the straddle type vehicle according to the embodiment of the present invention.
Figure 3:
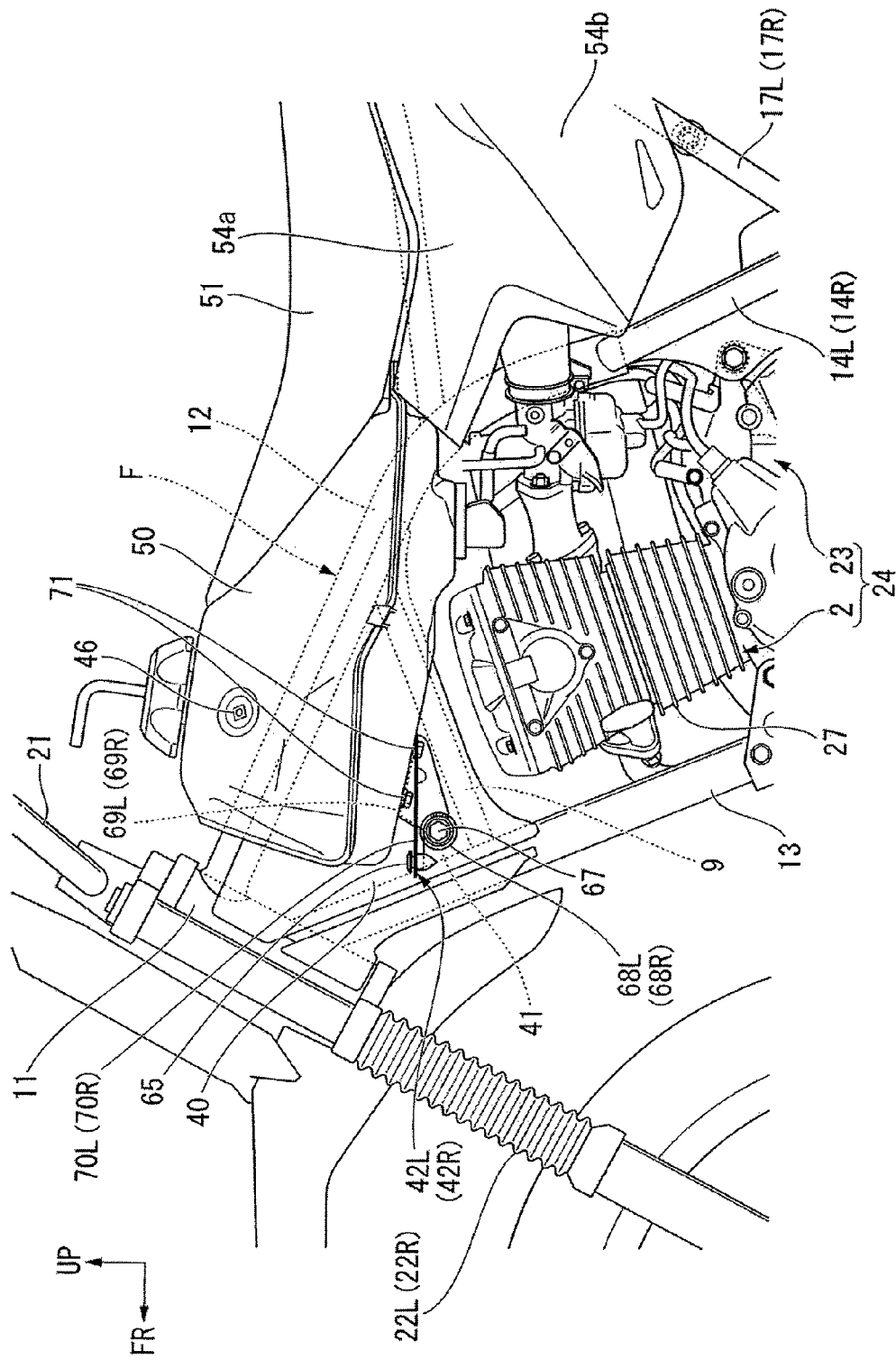
FIG. 3 is a side view without a tank cover in FIG. 2 of the straddle type vehicle according to the embodiment of the present invention.
Figure 4:
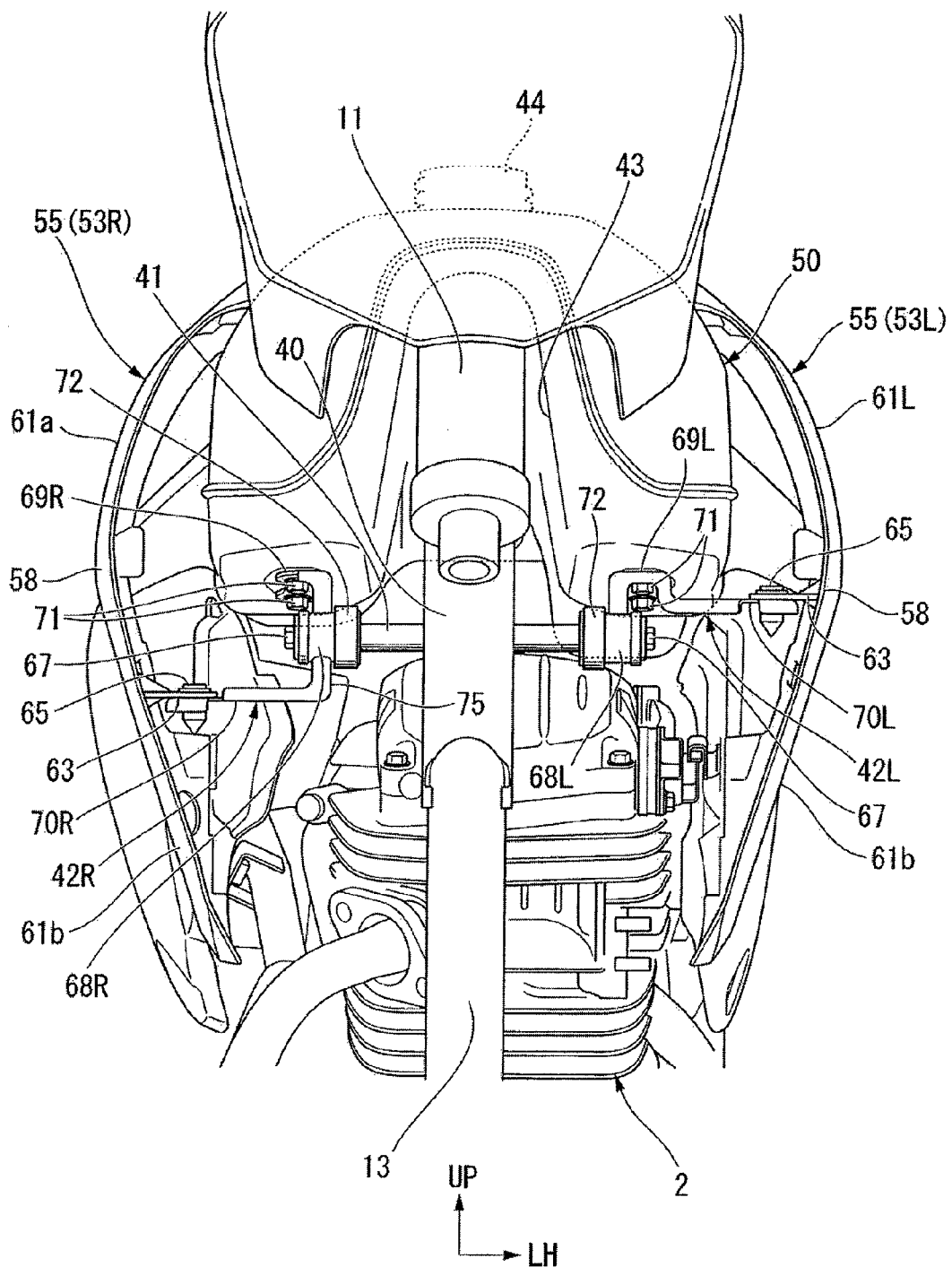
FIG. 4 is a view taken in a direction of an arrow A in FIG. 2 of the straddle type vehicle according to the embodiment of the present invention.
Figure 5:
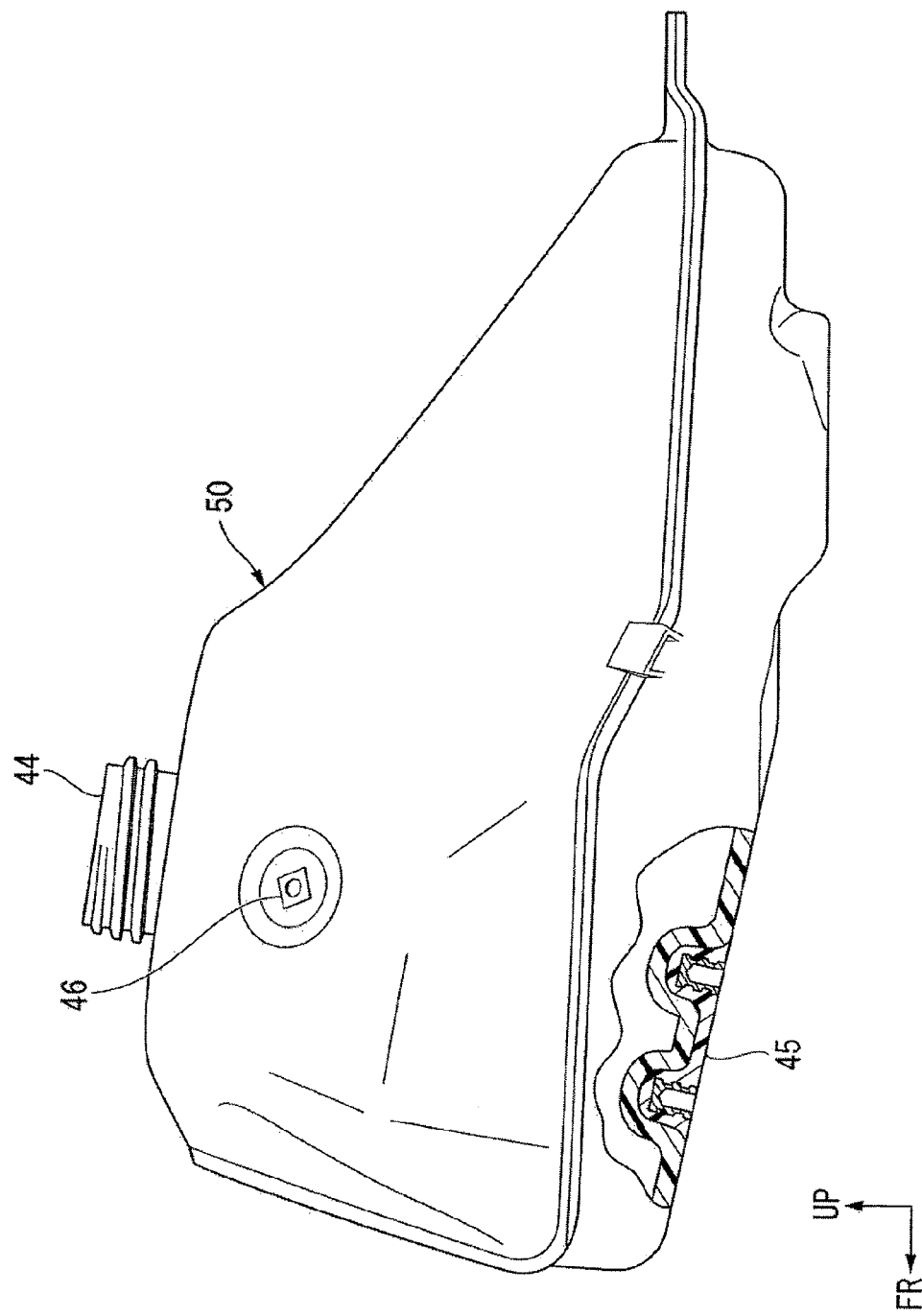
FIG. 5 is a partial cross-sectional side view of a fuel tank of the straddle type vehicle according to the embodiment of the present invention.
Figure 6:
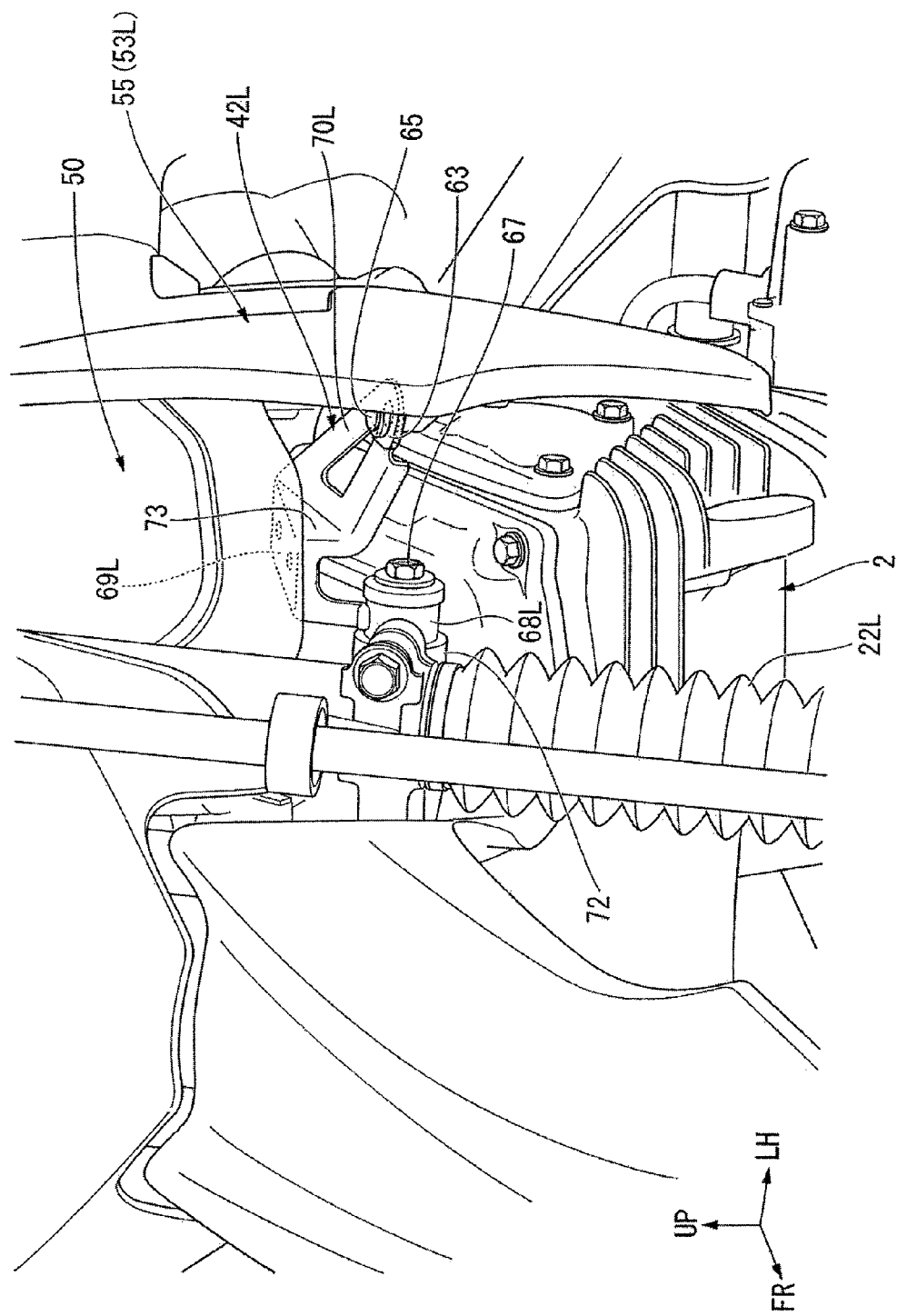
FIG. 6 is a perspective view showing the attachment portion of the tank cover on the left side of the straddle type vehicle according to the embodiment of the present invention, from obliquely upper side of the left front portion of the vehicle.
Figure 7:
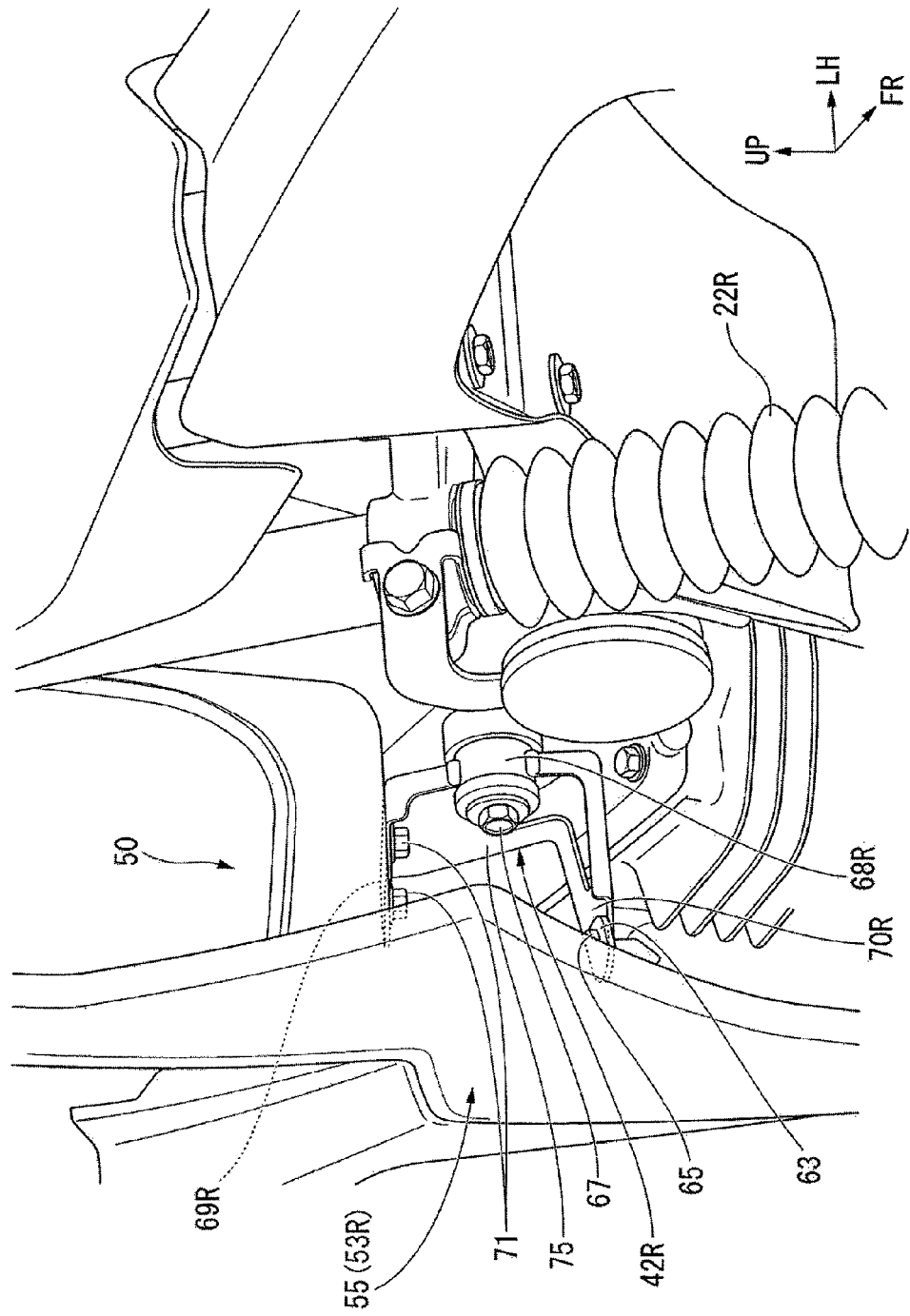
FIG. 7 is a perspective view showing the attachment portion of the tank cover on the right side of the straddle type vehicle according to the embodiment of the present invention, from obliquely upper side of the right front portion of the vehicle.

FIG. 2 is a view of the enlarged part in FIG. 1. FIG. 3 is a view without the tank covers 53L, 53R in FIG. 2. FIG. 4 is a view taken in a direction of an arrow A in FIG. 2. In addition, FIG. 5 is a partial cross-sectional side view of the fuel tank 50. FIGS. 6 and 7 are perspective views showing the attachment portions on the front portion side of the left and right tank covers 53L, 53R, respectively.

As shown in FIG. 3, the area, which is formed substantially in a triangle shape so as to be surrounded by the head pipe 11, the main frame 12, the downpipe 13 and the reinforcing pipe 9, is reinforced by a gusset plate 40, which is joined so as to straddle over the side surface of the four members. In addition, a support rod 41 (body frame member), which protrudes to the left and right sides in the width direction of the vehicle of the gusset plate 40 as shown in FIG. 4, is integrally connected to at least either of the gusset plate 40 or the reinforcing pipe 9.

Further, the saddle-shaped fuel tank 50 is disposed so as to straddle in the left-and-right direction over the upper portion of the main frame 12, the left and right lower surfaces of the front edge portion of the fuel tank 50 are connected to the support rod 41 via tank supporting brackets 42L, 42R, respectively. Incidentally, although the detailed description is omitted here, the rear portion of the fuel tank 50 is connected to the upper end side of the rear portion of the main frame 12 via the bracket (not shown).

As shown in FIG. 4, on the center side of the lower surface of the fuel tank 50, there is provided a concave groove 43 which is concaved along the front-and-rear direction of the vehicle for straddling over the main frame 12. And each lower surface of the left and right edge portions is formed flat. The entire fuel tank 50 is almost integrally formed with the heat-resisting resin material, and a fuel filler opening 44 is provided in the center of the upper end portion thereof.

As shown in FIG. 5, a stay 45 having a metal screw receiving portion is integrally molded on each lower surface of the left and right front edge portions of the fuel tank 50 when molding a tank. In addition, a nut 46, which is the attaching portion on the upper side of the tank covers 53L, 53R, is buried in the left and right side surfaces on the upper portion side of the front edge portion of the fuel tank 50.

Further, the entire lower surface of the left and right side edge portions of the fuel tank 50 is inclined downward to the rear so as to be directed to the upper portion of the engine 2 in such a state as to be attached to the vehicle body.

On the other hand, each of the left and right tank covers 53L, 53R is composed of three members; a front cover member 55, a rear cover member 56 and a lower cover member 57. And the front cover member 55 is connected to each of the above-mentioned tank supporting brackets 42L, 42R.

Figure 8:
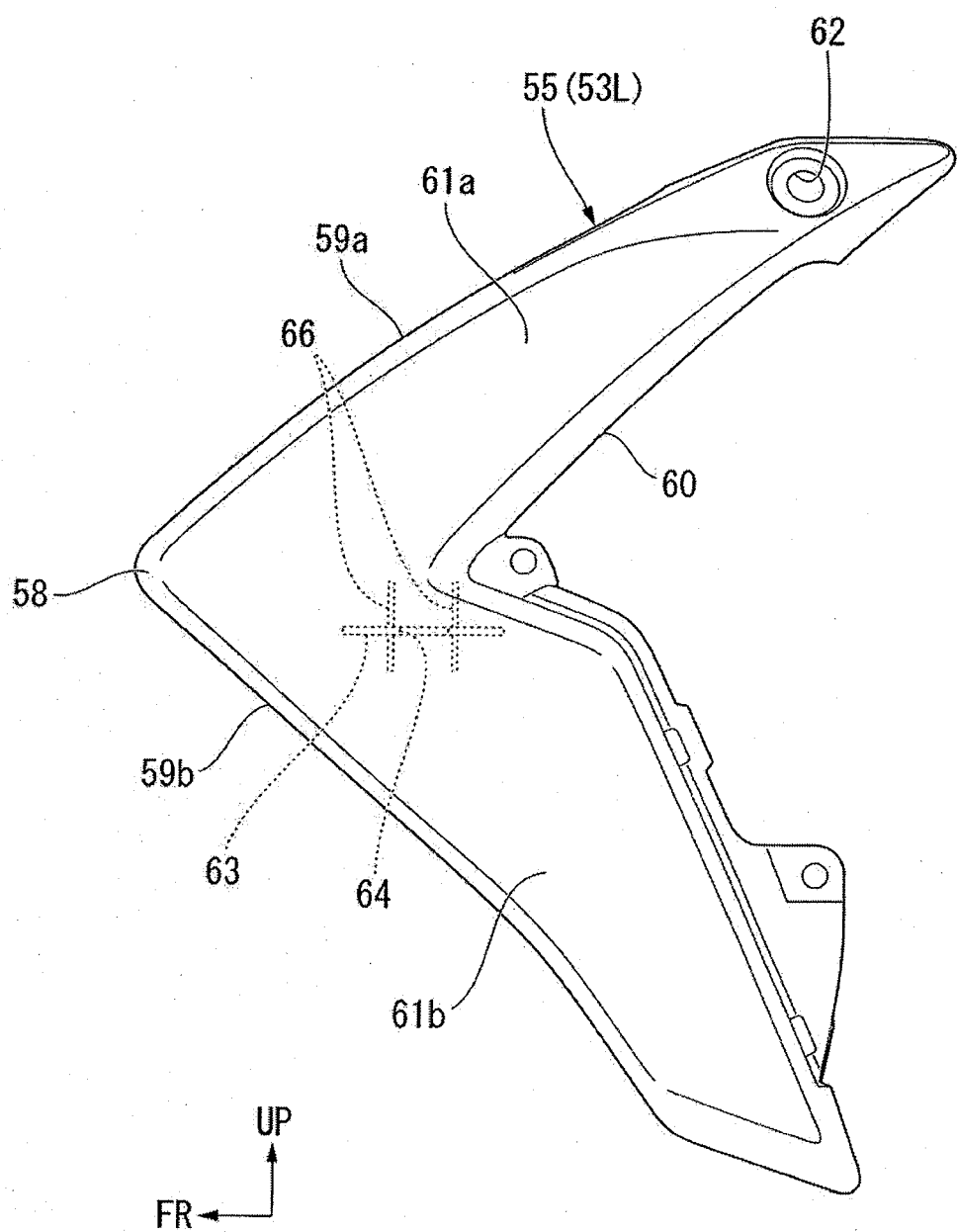
FIG. 8 is a side view of a front cover member of the tank cover on the left side of the straddle type vehicle according to the embodiment of the present invention.
Figure 9:
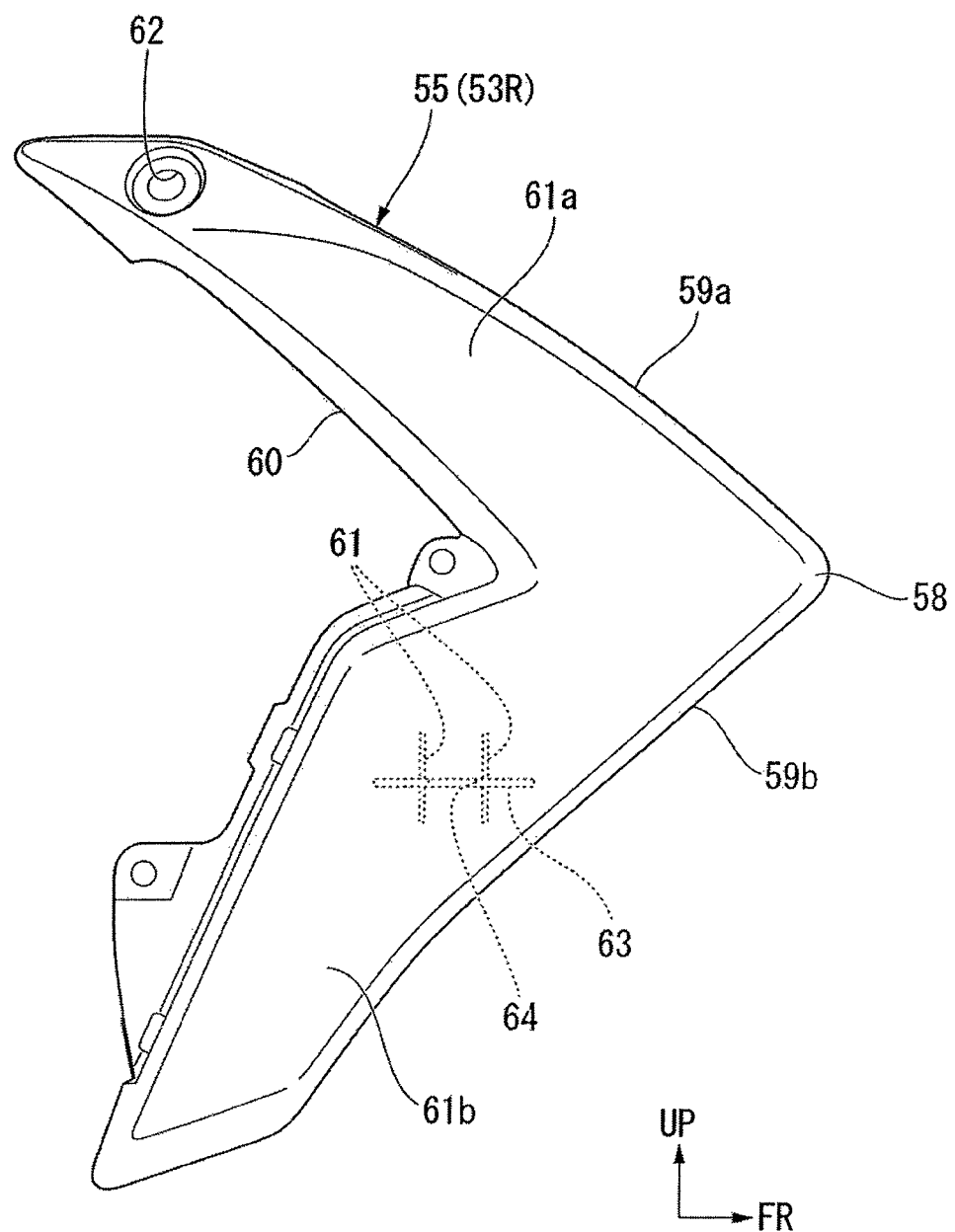
FIG. 9 is a side view of the front cover member of the tank cover on the right side of the straddle type vehicle according to the embodiment of the present invention.
Figure 10:
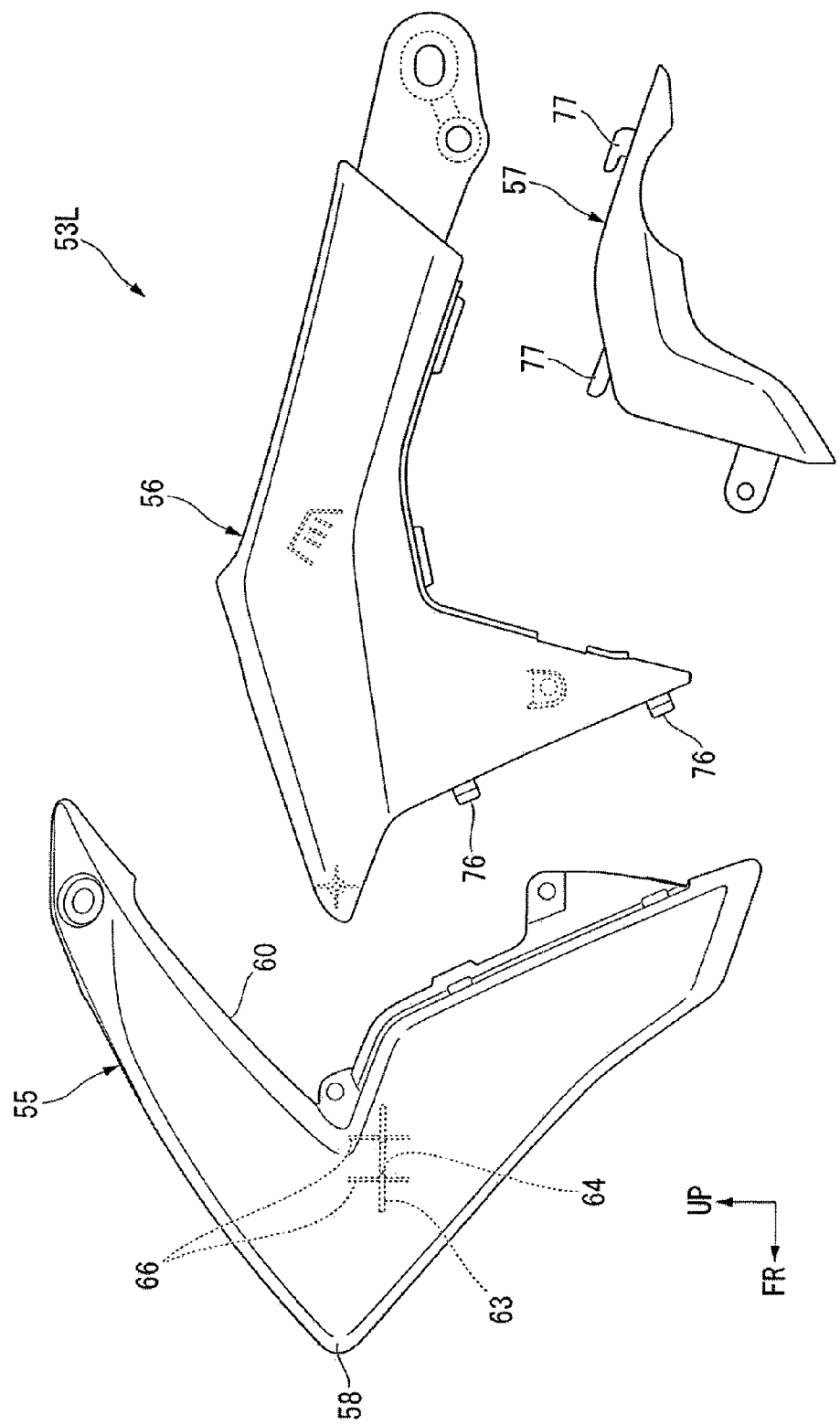
FIG. 10 is a side view of the components of the tank cover on the left side of the straddle type vehicle according to the embodiment of the present invention.

FIG. 8 shows the front cover member 55 of the tank cover 53L on the left side. FIG. 9 shows the front cover member 55 of the tank cover 53R on the right side. In addition, FIG. 10 shows the front cover member 55, the rear cover member 56, and the lower cover member 57 of the tank cover 53L on the left side, in such a state to be separated.

As shown in the drawings, the front cover member 55 includes a front top portion 58 that projects in an acute-angled shape toward the front side of the vehicle between the upper end potion and the lower end portion thereof in a side view of the vehicle; an inclined side of upper portion 59a that extends obliquely upward from the front top portion 58 so as to be directed to the upper end portion; and an inclined side of lower portion 59b that extends obliquely downward from the front top portion 58 so as to be directed to the lower end portion. Further, the front cover member 55 is provided with a cutout portion 60 of substantially L-shape on the rear side of the vehicle, and is formed entirely substantially in an L-shape in a side view. Hereinafter, out of the front cover member 55, the portion that extends rearward toward the upper side from the front top portion 58, is referred to as an upward extending part 61a, and the portion that extends rearward toward the lower side from the front top portion 58, is referred to as a downward extending part 61b.

In addition, as shown in FIG. 4, the left and right front cover members 55 have the upward extending part 61a and the downward extending part 61b curving respectively in the vertical direction, with the height position substantially in the vicinity of the front top portion 58 being the maximum protruding portion in the width direction of the vehicle.

In the vicinity of the upper end portion of the upward extending part 61a of the front cover member 55, a bolt hole 62, which fastens the portion with a bolt (a bolt 47 in FIG. 2) to the nut 46 buried in the upper side surface of the fuel tank 50, is formed, as shown in FIGS. 8 and 9.

In addition, a plate-like joining part 63 (joining portion), which extends substantially in the horizontal posture in such a state to be attached to the vehicle body, is provided so as to extend on the position, which is set substantially on the same level as the front top portion 58 provided substantially in the center in the front-rear width direction, on the backside of the front cover member 55 on the left side as shown in FIG. 8. An attaching hole 64, which penetrates the joining part 63 in the vertical direction, is formed in the joining part 63. A resin fastener 65 (see FIG. 4), which fixes the joining part 63 to the tank supporting bracket 42L, is fitted in the attachment hole 64. Incidentally, the reference numeral 66 in FIG. 8 is a reinforcing rib for reinforcing the joining part 63.

Although the front cover member 55 on the right side, as shown in FIG. 9, is configured so as to be substantially the same as the front cover member 55 on the left side as described above, the projection position of the joining part 63 of the front cover member 55 on the right side is set in slightly lower position relative to the projection position of the joining part 63 of the front cover member 55 on the left side.

As shown in FIGS. 4, 6 and 7, the left and right tank supporting brackets 42L, 42R have boss portions 68L, 68R that are fixed on the end surface in the axial direction of the support rod 41 so as to be fastened respectively by a bolt 67; connecting portions 69L, 69R that are fixed on the lower surface of the front edge portion of the fuel tank 50 so as to be fastened respectively by bolts 71; and the engaging portions 70L, 70R that extend toward the outer side in the width direction of the vehicle relative to the connecting portions 69L, 69R and are attached respectively to the joining part 63 of the front cover member 55. The tank supporting brackets 42L, 42R are entirely made of metal material, in which only the boss portions 68L, 68R are formed of steel pipe or iron bar material and the residual part is press-molded of metal plate.

As shown FIGS. 4 and 6, the tank supporting bracket 42L on the left side is configured such that the press component, which has the connecting portion 69L and an engaging portion 70L, is fixed thereto by welding in the area ranging from the top portion to the rear portion of the outer circumferential surface of the boss portion 68L.

The connecting portion 69L is formed such that the upper surface thereof is flat substantially in a rectangular shape. With the upper surface thereof overlapped on the lower surface of the fuel tank 50, the connecting portion is fastened to the stay 45 (see FIG. 5) at two positions in the front and the rear thereof by the bolts 71.

In addition, as shown in FIG. 6, on the outer side in the width direction of the vehicle of the connecting portion 69L, there is provided a bending wall 73 that bends downward and is substantially in a triangle shape in a side view. On the lower end of the bending wall 73, there is continuously provided the engaging portion 70L of a substantially triangle shape that extends outside (to the left side) in the width direction of the vehicle as well as extends forward. The attaching hole (not shown) is formed in the convergent end portion of the outer side in the width direction of the vehicle of the engaging portion 70L. The tip side of the engaging portion 70L extends substantially horizontally, and the joining part 63 of the front cover member 55 is overlapped on the upper surface on the tip side thereof in a horizontal posture. In such a state, the joining part 63 and the engaging portion 70L are joined by the resin fastener 65. With such constitution, the front cover member 55 on the left side is connected to the engaging portion 70L of the tank supporting bracket 42L.

Moreover, the boss portion 68L of the tank supporting bracket 42L is joined to the left end surface of the support rod 41 with bolt, in such a state that a cylindrical rubber bushing 72 (rubber elastic body) is sandwiched therebetween.

On the other hand, as shown in FIGS. 4 and 7, the tank supporting bracket 42R on the right side is configured such that the press component, which has the connecting portion 69R and the engaging portion 70R, is fixed thereto by welding in the area ranging from the top portion to the rear and lower portions of outer circumferential surface of the boss portion 68R. The press component is formed substantially in a U shape in a front view of the vehicle, and the connecting portion 69R is disposed on the upper side of the U shape while the engagement portion 70R is disposed on the lower side thereof. The boss portion 68R is fixed to the substantially center in the vertical direction of the area of the front end portion of a vertical wall 75 that connects the connecting portion 69R with the engaging portion 70R. The connecting portion 69R and the engaging portion 70R extend outside (to the right side) in the width direction of the vehicle from the upper and lower end portions of the vertical wall 75.

The connecting portion 69R is formed such that the upper surface thereof is flat substantially in a rectangular shape. With the upper surface thereof overlapped on the lower surface of the front edge portion on the right side of the fuel tank 50, the connecting portion 69R is fastened to the stay 45 (see FIG. 5) at two positions in the front and the rear thereof by the bolts 71.

In addition, the engaging portion 70R is formed substantially in a triangle shape, and an attaching hole (not shown) is formed in the convergent end portion of the outer side in the width direction of the vehicle thereof. The tip side of the engaging portion 70R extends substantially horizontally, and the joining part 63 of the front cover member 55 is overlapped on the upper surface on the tip side thereof in a horizontal posture. In such a state, the joining part 63 and the engaging portion 70R are joined by the resin fastener 65. With such constitution, the front cover member 55 on the right side is connected to the engaging portion 70R of the tank supporting bracket 42R.

In addition, as shown in FIG. 10, the rear cover member 56 is formed substantially in a T-shape in the side view of the vehicle, the front edge portion side of which is joined to the rear edge portion of the front cover member 55 so as to be engaged with engaging claws 76 and to be screwed. Further, the lower cover member 57 is famed substantially in an L-shape in the side view of the vehicle, the upper end portion of which is engaged with the lower edge portion on the rear side of the rear cover member 56 via engaging claws 77 while the front edge portion thereof is joined to the T-shaped leg portion of the rear cover member 56 so as to be screwed. Furthermore, the rear end portion of the rear cover member 56 is joined to the main frame 12 via a bracket (not shown).

As described above, the motorcycle 1 is provided with the tank covers 53L, 53R, which cover the area ranging from the side of the fuel tank 50 to side of the upper portion of the engine 2 on the left and right sides of the vehicle body, which thereby can securely protect the side portion of the fuel tank 50 with the tank covers 53L, 53R and enhance the appearance quality. Besides, the tank covers 53L, 53R can effectively guide the traveling wind to the upper portion of the engine 2 during the traveling of the vehicle.

In particular, in the motorcycle 1, since the lower surface of the fuel tank 50 is inclined downward to the rear so as to be directed to the upper portion of the engine 2, the tank covers 53L, 53R and the lower surface of the fuel tank 50 can effectively guide the traveling wind to the upper portion of the engine 2.

In the tank cover attachment structure of the embodiment of the present invention, the engaging portions 70L, 70R, which extend outside in the width direction of the vehicle relative to the connecting portions 69L, 69R with the fuel tank 50, are integrally provided to the tank supporting brackets 42L, 42R, and the joining part 63 of each front cover member 55 of the tank covers 53L, 53R is joined to the engaging portions 70L, 70R, respectively. Accordingly, the tank covers 53L, 53R can be supported on the body frame F with high strength and high positional accuracy using the tank supporting brackets 42L, 42R that are positioned below the front portion of the tank covers 53L, 53R.

Therefore, it is possible to securely fix the tank covers 53L, 53R on the vehicle body side, despite the fact that the tank covers 53L, 53R extend even to the side of the upper portion of the engine 2.

In addition, in the tank cover attachment structure, each front cover member 55 of the tank covers 53L, 53R can be attached to the body frame F without adding the dedicated components (for example, a flange portion and a stay) on the fuel tank 50 side and on the body frame F side, which thereby does not bring a higher price of the production cost due to the increase of the number of components.

Further, in the tank cover attachment structure of the embodiment of the present invention, the connecting portions 69L, 69R and the engaging portions 70L, 70R of the tank supporting brackets 42L, 42R are formed of a thin metal plate, and the connecting portions 69L, 69R are joined to the lower surface of the front edge portion of the fuel tank 50 with the bolts 71. Accordingly, during the travelling of the vehicle, it is possible to effectively suppress the resistance attributed to the traveling wind against the joining portions with the tank support brackets 42L, 42R and the fuel tank 50.

Furthermore, in the embodiment of the present invention, the joining parts 63 of the front cover members 55 of the tank covers 53L, 53R and the engaging portions 70L, 70R of the tank supporting brackets 42L, 42R extend substantially horizontally, respectively, and are joined so as to overlap with each other which thereby can effectively reduce the travel resistance against the portions during the traveling of the vehicle. In addition, in case of the embodiment of the present invention, the joining part 63 and the engaging portions 70L, 70R, which are joined with each other, are wide members in the front-and-rear direction of the vehicle. Thus, if the tank covers 53L, 53R receive the load in the direction to fall away from the front end side of the vehicle, the joining part 63 and the engaging portions 70L, 70R are not distorted. Further, in such a structure, the resin fastener 65 is engaged with the joining part 63 and each of the engaging portions 70L, 70R so as to penetrate therethrough in the thickness direction. Therefore, if the tank covers 53L, 53R receive the load in the direction to fall away from the front end side of the vehicle, the resin fastener 65 can receive the load as the shear load, which is favorable for strength.

Moreover, in the tank cover attachment structure, the upper side of the front cover member 55 of the tank covers 53L, 53R is directly joined to the nut 46 on the upper side surface of the fuel tank 50. The fuel tank 50 is directly joined to the connecting portions 69L, 69R of the tank supporting brackets 42L, 42R, and the front cover member 55 is directly joined to the engaging portions 70L, 70R of the tank supporting brackets 42L, 42R, respectively. Thus, it is possible to enhance the attachment accuracy between the front cover member 55 and the fuel tank 50, which thereby can enhance the appearance quality.

On the other hand, in the tank cover attachment structure, since each of the tank supporting brackets 42L, 42R and the support rod 41 on the vehicle body side are joined with the rubber bushing 72 sandwiched therebetween, so that the rubber bushing 72 can absorb the assembly error.

In addition, in case of the embodiment of the present invention, each front cover member 55 of the tank covers 53L, 53R includes the inclined side of upper portion 59a, which extends obliquely upward from the front top portion 58, and the inclined side of lower portion 59b which extends obliquely downward from the front top portion 58. The joining part 63, which is joined with each of the tank supporting brackets 42L, 42R of the front cover member 55, is set substantially on the same level as the front top portion. Accordingly, during the travelling of the vehicle, it is possible to effectively absorb the impact load generated when external obstacles make contact with the part in vicinity of the upper end portion of the inclined side of upper portion 59a of the front cover member 55 and in the vicinity of the lower end portion of the inclined side of lower portion 59b thereof. Therefore, with such a structure, it is possible to prevent the tank covers 53L, 53R from being damaged or prevent the tank covers 53L, 53R from falling away from the vehicle body before it occurs.

Further, the tank supporting bracket 42R on the right side in the embodiment of the present invention is configured such that the engaging portion 70R extends outside in the width direction of the vehicle after bending downward from the boss portion 68R and is joined to the front cover member 55. Accordingly, it is possible effectively suppress the flapping of the downward extending part 61b of the front cover member 55, and to stably maintain the shape of the downward extending part 61b.

Furthermore, the tank supporting bracket 42L on the left side in the embodiment of the present invention is configured such that the engaging portion 70L extends outside in the width direction of the vehicle after bending upward from the boss portion 68L and is joined to the front cover member 55. Accordingly, when the tank cover 53L is detached from the vehicle body, there is an advantage that the bolt 67 is easily unscrewed with tools such as a wrench from the opening on the front side of the tank cover 53L.

Incidentally, the present invention is not limited to the above-described preferred embodiment, but various modifications in design may be made without departing from the scope of the present invention.

DESCRIPTION OF REFERENCE NUMERALS 1 motorcycle
2 engine
41 support rod (body frame member above the engine)
42L, 42R tank supporting bracket
50 fuel tank
53L, 53R tank cover
58 front top portion
59a inclined side of upper portion
59b inclined side of lower portion
63 joining part (joining portion)
69L, 69R connecting portion
70L, 70R engaging portion
71 bolt
72 rubber bushing (rubber elastic body)

What is claimed is:

1. A tank cover attachment structure for a straddle vehicle, comprising:
   a fuel tank that is attached to a body frame member provided above an engine and stores fuel to be supplied to said engine, said body frame member extending in a width direction of the vehicle,
   tank covers that cover an area ranging from a side of said fuel tank to a side of an upper portion of said engine, and
   left and right tank supporting brackets that are attached to respective left and right portions of said body frame member below a front portion of said fuel tank and connect left and right front edge portions of said fuel tank to said body frame member respectively,
   wherein engaging portions, which extend outside in the width direction of the vehicle relative to connecting portions of said tank support brackets that are fixed to said fuel tank, are integrally provided to said tank supporting brackets, and said tank covers are connected to the engaging portions.

2. The tank cover attachment structure of the straddle vehicle, according to claim 1, wherein a main part of said tank supporting brackets is formed of a thin metal plate and is joined to said fuel tank with a bolt.

3. The tank cover attachment structure of the straddle vehicle, according to claim 1, wherein an area, which is located on an upper side relative to a joining portion of said tank covers with said tank supporting brackets, is directly joined to said fuel tank, said tank supporting brackets are fixed to said body frame member via a rubber elastic body and are directly joined to said fuel tank and to said tank covers without the rubber elastic body at the same time.

4. The tank cover attachment structure of the straddle vehicle, according to claim 1, wherein said tank covers have a front top portion that projects to a front side of the vehicle between an upper end portion and a lower end portion thereof in a side view of the vehicle; an inclined side of upper portion that extends obliquely upward from said front top portion so as to be directed to said upper end portion; and an inclined side of lower portion that is inclined obliquely downward from said front top portion so as to be directed to said lower end portion, and a joining portion of said tank covers with said tank supporting brackets is set substantially on the same level as said front top portion.

5. The tank cover attachment structure of the straddle vehicle, according to claim 1, wherein a joining portion of said tank covers with said tank supporting brackets and the engaging portions of said tank supporting brackets extend horizontally, respectively, and are joined so as to overlap with each other.

6. The tank cover attachment structure of the straddle vehicle, according to claim 1, wherein a lower surface of said fuel tank is inclined downward to the rear so as to be directed to the upper portion of said engine in a side view of the vehicle.

7. The tank cover attachment structure of the straddle vehicle, according to claim 1, wherein an area, which is located on an upper side relative to a joining portion of said tank covers with said tank supporting brackets, is directly joined to said fuel tank, said tank supporting brackets are fixed to said body frame member via a rubber elastic body and are directly joined to said fuel tank and to said tank covers without the rubber elastic body at the same time.

8. The tank cover attachment structure of the straddle vehicle, according to claim 2, wherein said tank covers have a front top portion that projects to the front side of the vehicle between an upper end portion and a lower end portion thereof in a side view of the vehicle; an inclined side of upper portion that extends obliquely upward from said front top portion so as to be directed to said upper end portion; and an inclined side of lower portion that is inclined obliquely downward from said front top portion so as to be directed to said lower end portion, and a joining portion of said tank covers with said tank supporting brackets is set substantially on the same level as said front top portion.

9. The tank cover attachment structure of the straddle vehicle, according to claim 3, wherein said tank covers have a front top portion that projects to a front side of the vehicle between an upper end portion and the lower end portion thereof in a side view of the vehicle; an inclined side of upper portion that extends obliquely upward from said front top portion so as to be directed to said upper end portion; and an inclined side of lower portion that is inclined obliquely downward from said front top portion so as to be directed to said lower end portion, and the joining portion of said tank covers with said tank supporting brackets is set substantially on the same level as said front top portion.

10. The tank cover attachment structure of the straddle vehicle, according to claim 7, wherein said tank covers have a front top portion that projects to the front side of the vehicle between an upper end portion and a lower end portion thereof in a side view of the vehicle; an inclined side of upper portion that extends obliquely upward from said front top portion so as to be directed to said upper end portion; and an inclined side of lower portion that is inclined obliquely downward from said front top portion so as to be directed to said lower end portion, and the joining portion of said tank covers with said tank supporting brackets is set substantially on the same level as said front top portion.

11. The tank cover attachment structure of the straddle vehicle, according to claim 2, wherein a joining portion of said tank covers with said tank supporting brackets and the engaging portions of said tank supporting brackets extend horizontally, respectively, and are joined so as to overlap with each other.

12. The tank cover attachment structure of the straddle vehicle, according to claim 3, wherein the joining portion of said tank covers with said tank supporting brackets and the engaging portions of said tank supporting brackets extend horizontally, respectively, and are joined so as to overlap with each other.

13. The tank cover attachment structure of the straddle vehicle, according to claim 4, wherein the joining portion of said tank covers with said tank supporting brackets and the engaging portions of said tank supporting brackets extend horizontally, respectively, and are joined so as to overlap with each other.

14. The tank cover attachment structure of the straddle vehicle, according to claim 10, wherein the joining portion of said tank covers with said tank supporting brackets and the engaging portions of said tank supporting brackets extend horizontally, respectively, and are joined so as to overlap with each other.

15. The tank cover attachment structure of the straddle vehicle, according to claim 2, wherein a lower surface of said fuel tank is inclined downward to the rear so as to be directed to the upper portion of said engine in a side view of the vehicle.

16. The tank cover attachment structure of the straddle vehicle, according to claim 3, wherein a lower surface of said fuel tank is inclined downward to the rear so as to be directed to the upper portion of said engine in a side view of the vehicle.

17. The tank cover attachment structure of the straddle vehicle, according to claim 4, wherein a lower surface of said fuel tank is inclined downward to the rear so as to be directed to the upper portion of said engine in a side view of the vehicle.

18. The tank cover attachment structure of the straddle vehicle, according to claim 5, wherein a lower surface of said fuel tank is inclined downward to the rear so as to be directed to the upper portion of said engine in a side view of the vehicle.

19. The tank cover attachment structure of the straddle vehicle, according to claim 14, wherein a lower surface of said fuel tank is inclined downward to the rear so as to be directed to the upper portion of said engine in a side view of the vehicle.

* * * * *